United States Patent [19]

Nill

[11] Patent Number: 5,037,242

[45] Date of Patent: Aug. 6, 1991

[54] DOCK FENDER AND SHOCK ABSORBER

[76] Inventor: A. Joseph Nill, 817 LaCosta Way, Lantana, Fla. 33462

[21] Appl. No.: 578,877

[22] Filed: Sep. 6, 1990

[51] Int. Cl.⁵ .............................................. E02B 3/26
[52] U.S. Cl. ..................................... 405/215; 405/211
[58] Field of Search ............... 405/211, 215, 212, 218, 405/213

[56] References Cited

U.S. PATENT DOCUMENTS

| | | | |
|---|---|---|---|
| 3,145,685 | 8/1964 | Kulick, Sr. | 405/213 X |
| 3,372,552 | 3/1968 | Liddell | 405/215 |
| 3,950,953 | 4/1976 | Matthews | 405/215 |
| 4,227,832 | 10/1980 | Leone et al. | 405/215 |
| 4,338,046 | 7/1982 | Thomerson | 405/215 X |
| 4,411,556 | 10/1983 | LeBlanc et al. | 405/213 |
| 4,662,791 | 5/1987 | Spicer | 405/211 X |
| 4,804,296 | 2/1989 | Smath | 405/212 |
| 4,848,969 | 7/1989 | Murota et al. | 405/215 |
| 4,884,919 | 12/1989 | Moore | 405/211 X |
| 4,900,192 | 2/1990 | Wood | 405/211 X |
| 4,964,760 | 10/1990 | Hartman | 405/215 |
| 4,968,182 | 11/1990 | Westwell | 405/215 |

*Primary Examiner*—Dennis L. Taylor
*Assistant Examiner*—J. Russell McBee
*Attorney, Agent, or Firm*—Malin, Haley, McHale, Dimaggio & Crosby

[57] ABSTRACT

An apparatus for protecting a boat from harmful contact with the piling of a dock is provided. The apparatus comprises a generally rigid, vertical, elongated tube, preferably made of PVC pipe and a hollow sleeve. The sleeve is preferably made of concentric layers of resilient and strength imparting material and has a hollow core aligned with the elongated axis of the tube. Lag bolts extend from inside the core of the sleeve, through the sleeve and wall of the tube into a wooden 2×4 within the tube. Also, lag bolts extend from inside the core of the sleeve, through the sleeve and into a piling. In this way, the tube is attached to the sleeve which is in turn attached to the piling. A seal and a cap with a vent are attached to the bottom and top of the tube respectively.

20 Claims, 1 Drawing Sheet

DOCK FENDER AND SHOCK ABSORBER

BACKGROUND OF THE INVENTION

1. Field of the Invention

The instant invention relates to dock fenders and more particularly to dock fenders with a shock absorber-type connection to a piling.

2. Description of Related Art

It has long been recognized that it is desirable to cushion the impact between a boat and dock piling, which impacts occur as a normal result of docking or mooring the boat against the dock piling. Examples of attempts to provide such cushioning are given in the following U.S. Pat. Nos.:

3,145,685, issued to Kulick, Sr., on Aug. 25, 1964
3,950,953, issued to Matthews, on Apr. 20, 1976
4,411,556, issued to LeBlanc et al., on Oct. 25, 1983
4,804,296, issued to Smath, on Feb. 14, 1989

DETAILED DESCRIPTION OF THE INVENTION

Figure 1:
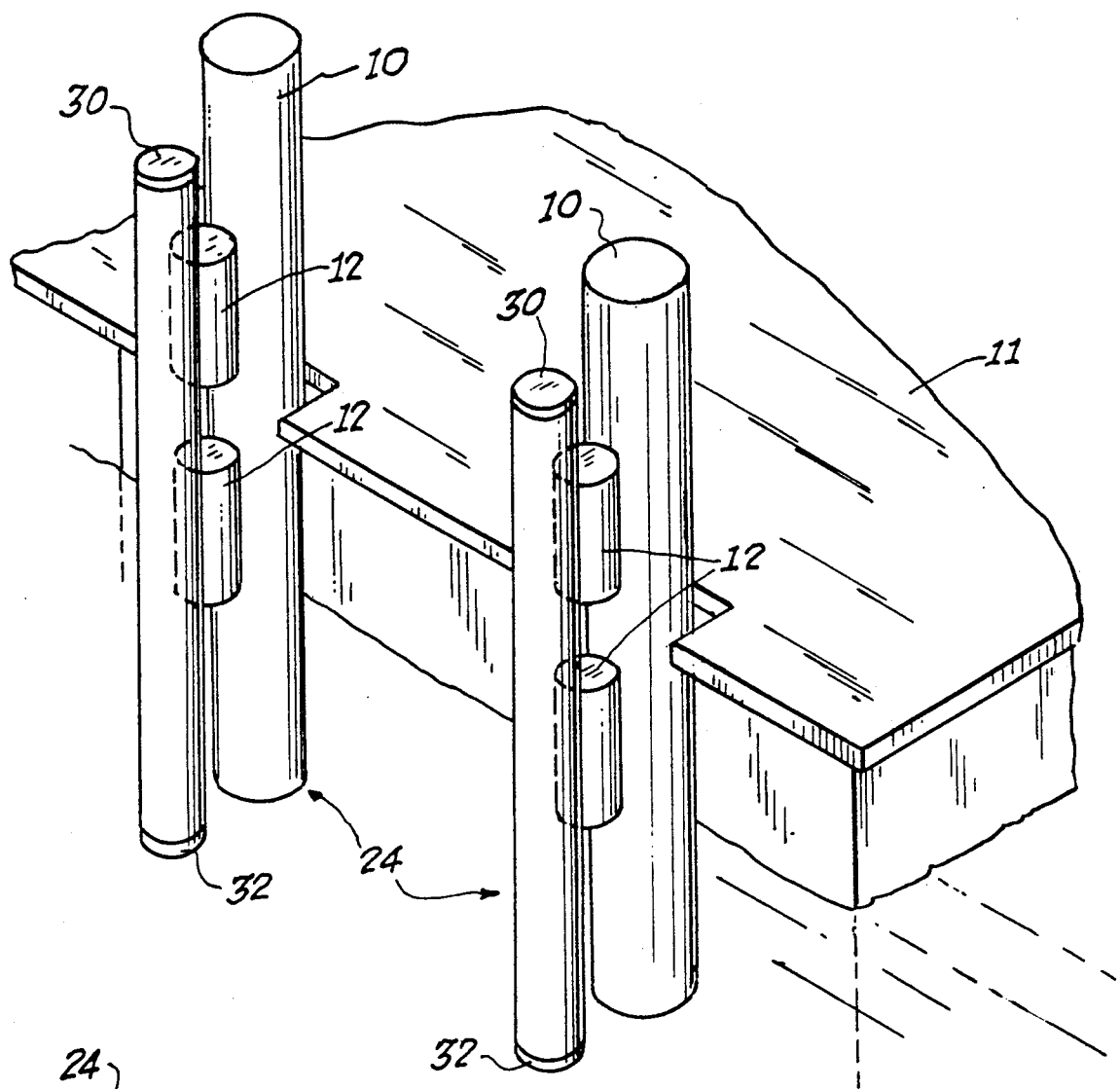
FIG. 1 is a perspective view of the invention in place attached to a piling at a dock.

FIG. 1 is a perspective view showing the dock fender 24 and sleeve 12 in position attached to a piling 10 of a dock 11. Dock fender 24 comprises a vertically positioned elongated tube 26 having a cap 30 at the uppermost end and a seal 32 at the lowermost end. The lowermost end of tube 26 preferably extends below the water level, while the uppermost end of tube 26 containing cap 30 extends a sufficient height above the water so that boats contacting dock fender 24 will contact the outer surface of dock fender 24 below cap 30.

Figure 2:
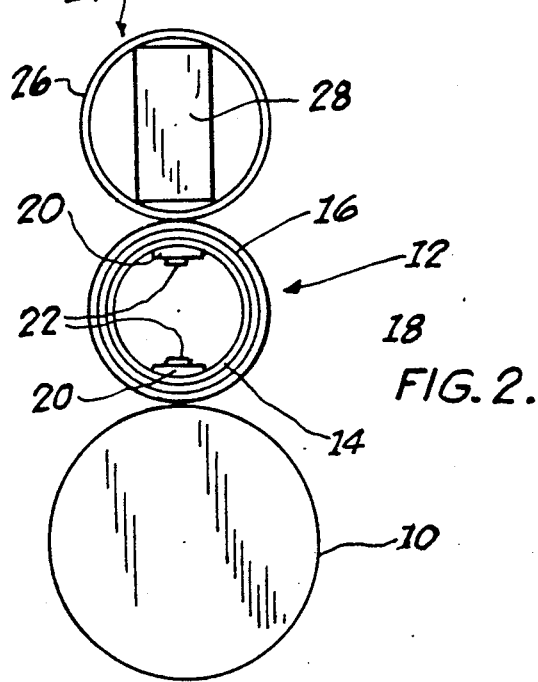
FIG. 2 is a plan cross-sectional view of the invention through line 2 in FIG. 1.

As is seen in more detail in FIG. 2, tube 26 preferably is a hollow pipe preferably made of polyvinylchloride (PVC) having an inside diameter of 4 inches. The thickness of the wall of pipe 24 is preferably ¼ inch but may be as thick as ½ inch. The typical length of tube 26 is about ten feet but may be of variable lengths from a few feet to over twenty feet. The dimensions given are merely exemplary and are not intended to be for limitation. A dock fender strengthening means 28, which is typically a common wooden 2×4, extends through the middle of tube 26 to add strength to dock fender 24.

Cap 30 and seal 32 are also made of polyvinylchloride (PVC). Cap 30 fits securely over the top of tube 26 and prevents water from entering the top of tube 26. To prevent cap 30 from being dislodged, a lag bolt 23 is threaded through cap 30 into the dock fender strengthening means 28. Because tightening lag bolt 23 into dock fender strengthening means 28 causes a depression in the top of cap 30 where water may accumulate, lag bolt 23 is preferably coated with a silicone sealer, such as is commonly used in the marine environment, to prevent water intrusion into tube 26.

Cap 30 preferably contains a vent 31 for allowing air to enter tube 26. Thereafter, the air may circulate within tube 26 around dock fender strengthening means 28. Allowing air to enter and circulate within tube 26 reduces the deterioration of dock fender strengthening means 28 caused by moisture within tube 26. Vent 31 may be just a void in cap 30 which void may be closable by a hinged covering or any other means for closing openings which are common in the boating industry and related fields.

Seal 32 at the bottom end of tube 26 prevents water from entering tube 26 at the lower end of tube 26. Seal 32 is a cap which fits securely over the bottom of tube 26. Seal 32 is sealingly connected to tube 26 by waterproof glue suitable for sealing PVC parts as is well known in the art. This waterproof connection prevents water from entering tube 26 through the bottom of tube 26.

Dock fender 24 is attached to piling 10 through sleeve 12. Sleeve 12 is a multi-layered tube having about the same exterior diameter as tube 26. Sleeve 12 preferably has three concentric layers around a hollow center. The inner layer 14 is preferably a one-half inch thick layer of an elastomer material such as rubber. Outside inner layer is middle layer 16 which adds strength to sleeve 12. Preferably, middle layer 16 comprises four layers of canvas or nylon to impart strength, as well as a degree of resiliency to sleeve 12. Middle layer 16 is also approximately one-half inch thick.

Outside middle layer 16 is outer layer 18 comprising a one-half inch layer of elastomer material such as rubber which adds to the shock absorbing capacity of the sleeve 12. The outer surface of outer layer 18 is preferably colored. This coloring is merely decorative and serves no functional purpose.

Once again, although explicit dimensions for the thickness and number of layers has been given, it is to be understood that this is by way of example and not by limitation.

Dock fender 24 is attached to sleeve 12 by means of lag bolts 22 extending through brackets 20A disposed on the interior surface of sleeve 12. Lag bolts 22 extend through the multiple layers 14, 16, 18 of sleeve 12, through the wall of tube 26 and are secured into dock fender strengthening means 28 within tube 26. Sleeve 12, in turn, is secured to piling 10 by means of lag bolts 22 extending through brackets 20B disposed on the interior surface of sleeve 12 opposite brackets 20A, through the layers 14, 16, 18 of sleeve 12 into piling 10. In this way, dock fender 24 is attached to sleeve 12 which in turn is attached to dock piling 10.

It has been found that the initial tightening of lag bolts 22 into the respective dock piling 10 or tube 26 and dock fender strengthening means 28 creates an effective initially watertight seal between the lag bolts 22 and sleeve 12. However, because of movement of the dock fender 24, from waves or docking and mooring of boats, and because the lowermost sleeve 12 is sometimes attached to a dock piling 10 so that sleeve 12 is underwater at high tide, the initially watertight seal between lag bolts 22 and sleeve 12 often leaks water into tube 26. Therefore, a silicone sealer, such as is commonly used in the marine environment, is preferably placed around lag bolts 22 prior to screwing lag bolts 22 through sleeve 12 into the respective dock piling 10 or tube 26 and dock fender strengthening means 28. Because the uppermost sleeve 12 is above the water at high tide, it may not be necessary to place the silicone sealer around the lag bolts 22 extending through this sleeve 12, in order to preserve the watertight seal. The silicone sealer prevents the intrusion of water into tube 26.

Brackets 20A, B as well as lag bolts 22 are preferably made of stainless steel to prevent rust from exposure to the moisture necessarily present in the marine environment.

In operation, as a boat approaches dock 11 for mooring, when the boat contacts dock fender 24, the impact of the boat upon dock fender 24 is dissipated through sleeve 12. The impact of the boat on dock fender 24 is dissipated primarily due to the resilient, deformable material which comprise the layers 14, 16, 18 of sleeve 12. Although most of the shock absorbing capacity of the dock fender 24 comes from the resiliency of sleeve 12, there is an amount of resiliency inherent in the PVC of tube 26. This inherent resiliency of tube 26 adds to the overall shock absorbing of dock fender 24.

This absorption of the impact upon dock fender 24 reduces the impact, and consequently the effect of the impact on both dock fender 24 and the boat. The presence of sleeve 12 provides a cushioning effect to impacts upon dock fender 24. Therefore, it is not necessary to replace dock fender 24 nor repair damage to a boat using dock 11 as often as has been required with prior art dock fenders.

In addition, once a boat has been securely moored to dock 11, the effect of the boat's movement and consequent contact with dock fender 24 due to the motion of water through wave action or through the wakes of passing boats is minimized due to the shock absorbing effect of sleeve 12. The shock absorbing effect of sleeve 12 in this context has the same benefits upon both dock fender 24 and the boat using dock fender 24 described above.

An additional benefit of placing sleeve 12 between piling 10 and dock fender 24 is that no matter what angle a boat impacts dock fender 24, the force of the impact will be dissipated through sleeve 12. This dissipation from any angle is due to sleeve 12's resistance to deformability in any direction because of the tubular shape of sleeve 12. It is particularly important to be able to dissipate the impact of a boat on dock fender 24 from any direction because a boat is likely to impact dock fender 24 from any direction, both as the boat approaches the dock 11 for mooring and as the boat is moved by wares and wakes while moored. In this way, both the boat and dock fender 24 are protected during impact.

While the instant invention has been described in connection with the specific embodiment, it is to be understood that this description is given by means of example and not by means of limitation. For example, the composition of sleeve 12, although given as a preferred embodiment, is not critical to the operation of the invention. It is within the scope of the invention to include any means for resiliently connecting a dock fender 24 to a piling 10 which can dissipate the force of the impact of a boat on dock fender 24 from any direction.

In addition, the specific structure of dock fender 24, including having a wooden 2×4 insert as the dock fender strengthening means 28, is not critical to the instant invention as long as a fender is provided which has sufficient strength to absorb the impact of a boat in the conditions for which such dock fenders are found and which has means for connecting to sleeve 12.

It is clear that changes and modifications can be made to the foregoing description and still be within the scope of the invention. Further, it is understood that obvious changes and modifications will occur to those persons skilled in the art.

Having thus described the instant invention, it is claimed:

1. An apparatus for protecting a boat from harmful contact with the piling of a dock, comprising:
    a generally rigid elongated tube;
    a sleeve manufactured at least in part of resilient, flexible material, having a central bore disposed in parallel alignment to said tube, said sleeve connected to said tube along one side of said sleeve, said sleeve connected to said piling along the opposite side of said sleeve;
    means for connecting said sleeve to said tube; and
    means for connecting said sleeve to said piling.

2. The apparatus of claim 1 wherein said tube is vertically disposed.

3. The apparatus of claim 1 wherein said sleeve is a plurality of layers, said layers concentrically disposed around said bore.

4. The apparatus of claim 3 wherein said plurality of layers comprise:
    an inner layer manufactured of an elastomer material;
    a middle layer manufactured of a material to impart strength to said sleeve; and,
    an outer layer manufactured of an elastomer material;
    whereby said middle layer imparts strength to said sleeve and said inner and outer layers impart resiliency and flexibility to said sleeve whereby impacts transferred to said sleeve from said tube are absorbed and dissipated by said sleeve.

5. The apparatus of claim 1 wherein said means for connecting said sleeve to said tube comprises:
    a bracket aligned with the axis of said bore of said sleeve, located within said bore at the closest point within said bore to said tube; and
    means, extending from within said bore, through said bracket and said sleeve into said tube, for drawing said bracket and thereby said sleeve into binding contact with said tube.

6. The apparatus of claim 5 wherein said means for drawing said bracket into binding contact comprises lag bolts.

7. The apparatus of claim 1 wherein said tube further comprises means for closing the opposing ends of said tube.

8. The apparatus of claim 2 wherein said tube further comprises mean for closing the opposing ends of said tube.

9. The apparatus of claim 8 wherein said means for closing comprises:
    a cap attached to the uppermost end of said tube; and
    a seal, attached to said lowermost end of said tube, said seal preventing water from entering the interior of said tube through said lowermost end of said tube.

10. The apparatus of claim 4 wherein said elastomer material in said inner layer is synthetic rubber.

11. The apparatus of claim 4 wherein said material to impart strength to said sleeve comprises a closely woven cloth.

12. The apparatus of claim 4 wherein said elastomer material in said outer layer is synthetic rubber.

13. The apparatus of claim 1 wherein said elongated tube is manufactured of polyvinylchloride.

14. The apparatus of claim 1 further comprising means, within said elongated tube, for strengthening said elongated tube.

15. The apparatus of claim 14 wherein said means for strengthening comprises a wood member, aligned with the elongated axis of said elongated member, disposed within said tube.

16. The apparatus of claim 1 wherein said means for connecting said sleeve to said piling comprises:
   a bracket, aligned with the axis of said bore of said sleeve, located within said bore at the closest point within said bore to said piling; and
   means, extending from within said bore, through said bracket and said sleeve into said piling, for drawing said bracket and thereby said sleeve into binding contact with said piling.

17. The apparatus of claim 16 wherein said means for drawing said bracket into binding contact comprises lag bolts.

18. An apparatus for protecting a boat from harmful contact with the piling of a dock, comprising:
   a generally rigid elongated tube substantially vertically disposed, including means for closing the opposing ends of said tube;
   a sleeve having a central bore, said sleeve and said bore disposed in parallel alignment to said tube, said sleeve manufactured of a plurality of concentrically arranged layers including at least one layer of resilient, flexible material, said sleeve connected to said piling along the outside of said sleeve and connected to said tube along the outside of said sleeve opposite said piling;
   means for connecting said sleeve to said tube comprising:
   a bracket, aligned with the axis of said bore of said sleeve, located within said bore at the closest point within said bore to said tube; and
   means, extending from within said bore, through said bracket and said resilient material into said tube, for drawing said bracket and thereby said sleeve into binding contact with said tube; and
   means for connecting said sleeve to said piling comprising:
   a bracket, aligned with the axis of said bore of said sleeve, located within said bore at the closest point within said bore to said piling; and
   means, extending from within said bore, through said bracket and said sleeve into said piling, for drawing said bracket and thereby said sleeve into binding contact with said piling.

19. An apparatus for protecting a boat from harmful contact with the piling of a dock, comprising:
   a generally rigid elongated tube substantially vertically disposed, including:
   means for closing the opposing ends of said tube comprising:
   a cap attached to the uppermost end of said tube; and
   a seal, attached to the lowermost end of said tube, said seal preventing water from entering the interior of said tube through said lowermost end of said tube;
   means, within said tube, for strenghtening said tube;
   a sleeve having a central bore, said sleeve and said bore disposed in parallel alignment to said tube, said sleeve connected to said piling along the outside of said sleeve and connected to said tube along the outside of said sleeve opposite said piling; said sleeve manufactured of a plurality of concentrically arranged layers including:
   an inner layer manufactured of an elastomer material;
   a middle layer manufactured of a material to impart strength to said sleeve; and,
   an outer layer manufactured of an elastomer material;
   whereby said middle layer imparts strength to said sleeve and said inner and outer layers impart resiliency and flexibility to said sleeve whereby impacts transferred to said sleeve from said tube are absorbed and dissipated by said sleeve;
   means for connecting said sleeve to said tube comprising:
   a bracket, aligned with the axis of said bore of said sleeve, located within said bore at the closest point within said bore to said tube; and
   means, extending from within said bore, through said bracket and said sleeve into said tube, for drawing said bracket and thereby said sleeve into binding contact with said tube; and,
   means for connecting said sleeve to said piling comprising:
   a bracket, aligned with the axis of said bore of said sleeve, located within said bore at the closest point within said bore to said piling; and
   means, extending from within said bore, through said bracket and said sleeve into said piling, for drawing said bracket and thereby said sleeve into binding contact with said piling;
   whereby impact of a boat upon said tube is dissipated through said sleeve thereby providing a cushioning effect to the impact of said boat with said tube.

20. An apparatus for protecting a boat from harmful contact with the piling of a dock, comprising:
   a generally rigid elongated tube substantially vertically disposed, including:
   means for closing the opposing ends of said tube comprising:
   a cap attached to the uppermost end of said tube; and
   a seal, attached to the lowermost end of said tube, said seal preventing water from entering the interior of said tube through said lowermost end of said tube;
   means, within said tube, for strengthening said elongated tube;
   a sleeve having a central bore, said sleeve and said bore disposed in parallel alignment to said tube, said sleeve connected to said piling along the outside of said sleeve and connected to said tube along the outside of said sleeve opposite said piling; said sleeve manufactured of a plurality of concentrically arranged layers including:
   an inner layer manufactured of synthetic rubber;
   a middle layer manufactured of canvas;
   an outer layer manufactured of synthetic rubber;
   whereby said middle layer imparts strength to said sleeve and said inner and outer layers impart resiliency and flexibility to said sleeve whereby impacts transferred to said sleeve from said tube are absorbed and dissipated by said sleeve;
   means for connecting said sleeve to said tube comprising:
   a bracket, aligned with the axis of said bore of said sleeve, located within said bore at the closest point within said bore to said tube; and
   lag bolts, extending from within said bore, through said bracket and said sleeve into said tube, for drawing said bracket and thereby said sleeve into binding contact with said tube; and,
   means for connecting said sleeve to said piling comprising:
   a bracket, aligned with the axis of said bore of said sleeve, located within said bore at the closest point within said bore to said piling; and
   lag bolts, extending from within said bore, through said bracket and said sleeve into said piling, for drawing said bracket and thereby said sleeve into binding contact with said piling;
   whereby impact of a boat upon said tube is dissipated through said sleeve thereby providing a cushioning effect to the impact of said boat with said tube.

* * * * *